United States Patent [19]

Loftin

[11] Patent Number: 4,709,359
[45] Date of Patent: Nov. 24, 1987

[54] END WEIGHTED REED SOUND TRANSDUCER

[75] Inventor: Rayford A. Loftin, Fort Wayne, Ind.

[73] Assignee: Magnavox Government and Industrial Electronics Company, Fort Wayne, Ind.

[21] Appl. No.: 392,657

[22] Filed: Jun. 28, 1982

[51] Int. Cl.$^4$ ............................................. H04R 17/00
[52] U.S. Cl. ..................................... 367/155; 367/161
[58] Field of Search ..................... 310/329, 331, 332; 367/155, 160, 161, 153, 154, 157

[56] References Cited

U.S. PATENT DOCUMENTS

| | | | |
|---|---|---|---|
| 2,045,404 | 6/1936 | Nicholides | 367/160 |
| 2,352,311 | 6/1944 | DiToro | 367/161 |
| 2,747,090 | 5/1956 | Cavalieri, Jr. et al. | 310/331 |
| 2,906,991 | 9/1959 | Camp . | |
| 3,187,300 | 6/1965 | Brate . | |
| 3,255,431 | 6/1966 | Howatt | 367/155 |
| 3,258,738 | 6/1966 | Merchant . | |
| 3,360,770 | 12/1967 | Friedman et al. | 367/161 |
| 3,371,234 | 2/1968 | Cady | 310/329 |
| 3,603,921 | 9/1971 | Dreisbach . | |
| 3,744,016 | 7/1973 | Davis | 367/154 |
| 3,803,546 | 4/1974 | Leon . | |
| 3,983,425 | 9/1976 | Barlow . | |
| 4,131,874 | 12/1978 | Geohegan, Jr. | 367/160 |
| 4,268,912 | 5/1981 | Congdon . | |
| 4,287,582 | 9/1981 | Tocquet . | |
| 4,333,029 | 6/1982 | Kolm | 310/331 |

Primary Examiner—Harold J. Tudor
Attorney, Agent, or Firm—Thomas A. Briody; William J. Streeter; Richard T. Seeger

[57] ABSTRACT

A cylindrical shell enclosure has mounted interiorly thereof in cantilever manner four upstanding laminated planar flexible resilient electroacoustic transducer reeds. A separate inertia weight is affixed to the top edge of each reed. An acoustic wave impinging on the side wall of the submerged enclosure will cause relative movement between the enclosure and a weight if the wave direction has a component transverse to the plane of the reed on which the weight is mounted. The reeds are mounted in quadrature so that wave direction detection is provided by comparing the electrical outputs of the reeds. Viscoelastic damping pads may be affixed between the side ends of each of the weights and respective upstanding rigid arms secured to an interior surface of the enclosure.

28 Claims, 7 Drawing Figures

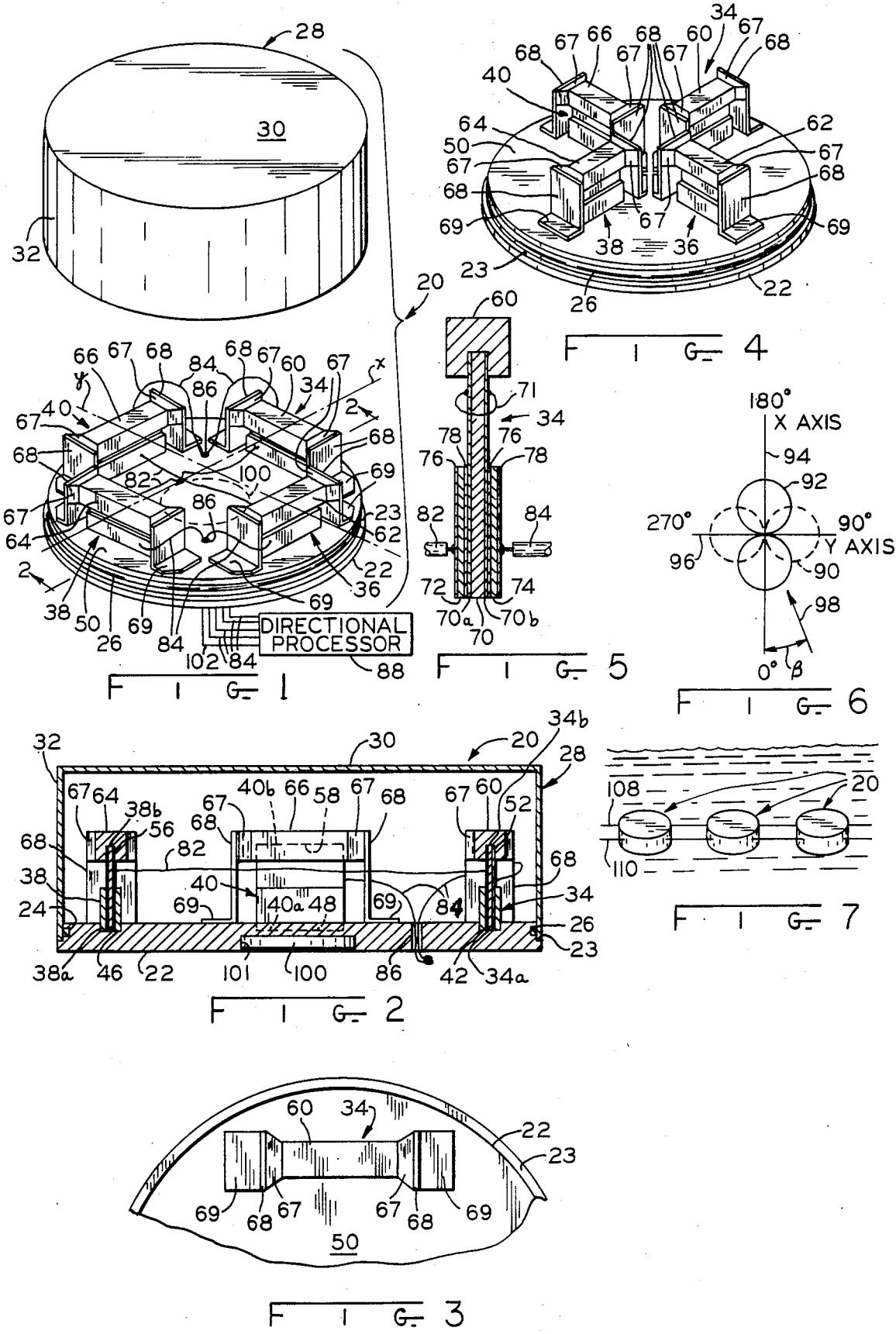

END WEIGHTED REED SOUND TRANSDUCER

BACKGROUND OF THE INVENTION

1. Field of the Invention

The present invention relates to an electroacoustic transducer and more particularly to a laminated electroacoustic reed hydrophone.

2. Description of the Prior Art

Reed hydrophones are known to the art, one such hydrophone being disclosed in U.S. Pat No. 3,603,921. The hydrophone in that patent has an electroacoustic transducer in the form of a flexible resilient reed having laminates of piezoelectric material and electrode material bonded to opposite surfaces thereof. The reed is affixed at one end in cantilever manner to an inertial mass, the other end being free, and impinging sound waves on the reed sides cause the reed to flex generating an electrical output corresponding to the reed deflection. In another electroacoustic reed assembly, such as disclosed in U.S. Pat. No. 3,803,546, two pairs of laminated reeds are connected to a central inertial mass. One end of each reed is connected in cantilever manner to the mass, the reeds in each pair extending from opposite sides of the mass. A viscous paste is between the other end of each reed and the interior wall of a housing. A sound wave impinging on the housing and having a directional component parallel to a reed, causes compressional flexing of that reed and an electrical output corresponding to the degree of flexing of the reed.

Such previous reed hydrophones while serving satisfactorily as electroacoustic transducers for certain purposes were limited as to sensitivity, adaptability, versatility, weight, dimension and/or mechanical complexity and relatively expensive manufacture.

SUMMARY OF THE INVENTION

A reed hydrophone has a rigid, cylindrical, relatively low mass outer shell enclosure. Four upstanding flexible planar laminated electroacoustic transducer reeds are mounted in quadrature to the interior surface of the bottom of the enclosure. A separate inertial weight is secured to the upper edges of each of the reeds. Electrode leads from each of the electrodes are coupled to conventional processor circuitry to determine sound wave direction from the relative bending of the reeds and transmit this information to a receiving station.

An acoustic wave impinging upon a side wall of the immersed enclosure causes it to move relative to one or more of the inertial weights in an amount proportional to the directional component of that wave that is transverse to the plane of the reed supporting that weight. Only two reeds, one mounted orthogonally to the other, are required to provide sine like and cosine like patterns for wave direction detection. However, two or more reeds may be mounted in each of the orthogonal directions and electrically connected in series for additive output and improved sensitivity.

The reeds bend an amount proportional to the acceleration of the enclosure relative to the weights, with corresponding electrical outputs being provided to the detection circuitry. The reed mounting is relatively simple and inexpensive. Each reed is secured to a separate weight which may be selected to match the properties of that particular reed or to obtain a particular output from that reed. Due to the end weighted reed, a relatively low profile reed construction is possible since a greater degree of reed bending occurs for a given amplitude acoustic wave and given reed properties and dimensions. Each weight may be damped by bonding a pad of viscoelastic material between each side end of the weight and a respective upstanding rigid ear secured to an interior surface of the enclosure, which also protects against large deformations of the reeds due to shock loads encountered in manufacture, transportation, storage, or deployment. Alternatively, the pad may be bonded to a second or detuning mass. The fluid medium inside the enclosure may be air to provide a positive buoyancy which is an advantage when an array of submerged hydrophones are spaced along a horizontal cable since each hydrophone in the array supports the cable weight.

It is therefore an object of this invention to provide an electroacoustic transducer of relatively simple and inexpensive construction and relatively high sensitivity and versatility in function.

An object of this invention is to provide a reed hydrophone having reeds mounted at a respective one of their ends in cantilever manner to a shell enclosure and provided with a separate individual inertial weight at the respective opposite end.

It is an object of this invention to provide a reed hydrophone having a relatively low profile.

A further object of this invention is to provide in hydrophones of the previous objects means to dampen reed vibration and also protect against large deformations of the reeds due to shock loads encountered in manufacture, transportation, storage, or deployment.

It is an additional object to provide a hydrophone having a positive buoyancy to aid in cable support of a horizontal array of the hydrophones.

These and other objects and advantages will become more apparent when embodiments of this invention are described and disclosed in reference to the drawings, briefly described as follows.

BRIEF DESCRIPTION OF THE DRAWINGS

FIG. 1 is a simplified exploded view in perspective partially block diagram of a preferred embodiment of this invention;

FIG. 2 is an enlarged section taken at line 2—2 of FIG. 1 of an assembled hydrophone;

FIG. 3 is an enlarged partial plan view of the hydrophone of FIG. 1 with the cover removed;

FIG. 4 is a partial perspective view of the enclosure bulkhead of FIG. 1 having the reeds mounted in orthogonally related planes;

FIG. 5 is an enlarged partial section of a reed construction having a weight secured to one end;

FIG. 6 is a directivity pattern plotted on x-y axes for the hydrophone of FIG. 1; and FIG. 7 is a simplified perspective view of an horizontal line array of hydrophones of this invention.

DESCRIPTION OF A PREFERRED EMBODIMENT

In the following descriptions and accompanying drawings, like reference numerals and characters designate like parts, constructions, and functions. While a hydrophone for converting acoustic waves to corresponding electrical signals is shown and described herein, it is to be understood that the embodiments of this invention are also capable of the reciprocal acoustic wave transmitter or projector function of converting electrical signals to corresponding acoustic waves.

Hence, this invention pertains broadly to electroacoustic transducers.

Referring to FIGS. 1-3, hydrophone 20 has circular bottom plate bulkhead or base 22 provided a radially outwardly extending shoulder 23. Peripheral groove 24 in base 22 snugly receives "o" ring 26. A cylindrically shaped cover 28 has top 30 and annular sidewall 32 fitting closely over ring 26 and the lower edge of wall 32 seating against shoulder 23 in the assembled state to provide an hermetic seal so that hydrophone 20 can be submerged without air escaping or liquid entering its enclosure. Bulkhead 22 and cover 28 are of a rigid, thin, relatively lightweight material such as aluminum or rib reinforced plastic. Axes "x" and "y" in the plane of bulkhead 22 are perpendicular to one another.

Flexible, thin, planar, upstanding, electroacoustic transducer reeds 34, 36, 38, 40 are each mounted in cantilever manner to base 22 and each have a lower edge 34a, 36a, 38a, 40a, respectively, which edges are secured in base 22 upper surface grooves 42, 44, 46, 48, respectively, as by epoxy cementing. Reeds 34, 36, 38, 40 are arranged in quadrature with a first pair, reeds 34, 38, being parallel to and on either side of the "y" axis and a second pair, reeds 36, 40, being parallel to and on either side of the "x" axis. The upper edges 34b, 36b, 38b, 40b of reeds 34, 36, 38, 40, respectively, are secured in grooves 52, 54, 56, 58, respectively, of inertia weights 60, 62, 64, 66, respectively, which may be of lead or other high weight density material, as with epoxy cement. Weights 60, 62, 64, 66 in a particular operable embodiment are ¼ ounce each making a total of only one ounce for the four weights 60-66, reeds 34-40 each extending ⅝ inches above surface 50 in that embodiment. The stiffness of the reed is selected for desired results and, in general, the stiffer the reed the greater the weight required to achieve a given sensitivity, other factors being equal. The width of the reed affects the electrical impedance, in general the wider the reed the lower the impedance.

Viscoelastic damping material 67 is bonded to and between each side end of each weight 60, 62, 64, 66 and an upstanding cantilevered rigid bracket arm 68 formed with foot 69 extending laterally from its lower end, each of which is secured to base 22 as by cementing foot 69 to surface 50. Material 67 is an elastic material of low Bayshore or resistivity such as rubber, a polyether based polyeurethane, silicone or butyl. The trade name of a material having a low Q or resilience is Dow Chemical Company Syleguard 188 or 189. While hydrophone 20 is operable without any motion damping of weights 60-66, material 67 provides desired motion response, mechanical Q, thermal stability, and protection against shock loads to the reeds during manufacture, transportion, storage and deployment. As seen best in FIG. 3, material 67 is preferably tapered outwardly from each end of the weights 60-66 to the respective bracket arm 68 to provide a gradually increasing effect as the motion of a weight increases in a direction transverse to the plane of the respective reed on which the weight is mounted. Other damping configurations and position arrangements are possible and may be utilized in this invention.

If desired reeds 34, 36, 38, 40 may be placed on bulkhead 22 in the configuration shown in FIG. 4 where reeds 34, 38 are coplanar and reeds 36, 40 are coplanar and in a plane orthogonal to the plane of reeds 34, 38. As will become apparent, hydrophone 20 is operable for direction finding of an acoustic wave using only two reeds, one reed in each of two orthogonally related planes, the reed in one plane providing a sine like pattern and the reed in the other plane providing a cosine like pattern. Although even a single reed element is capable of producing a planar directivity pattern of the the familiar "figure-8", two such elements when mounted in the same, or parallel to the same, plane, each on directly opposite sides of the hydrophone center axis, may be interconnected to produce the same type pattern with improved symmetry and increased sensitivity.

Referring to FIG. 5, reed 34 removed from base 22 and weight 60 are shown in section, the electroacoustic transducer portion of which is known in the art and will be briefly described. While reed 34 will be described, it is understood that reeds 36, 38, 40 are of similar construction. Reed 34 is a lamination of a center or inner planar stiffly flexible resilient insulative board 70, which may be of a material used in printed circuit boards such as General Electric G-10 board. Each board 70 has a one mil laminate 70a, 70b of a conductive material such as silver or copper deposited on opposite sides thereof respectively. Laminates 70a, 70b are electrically coupled to each other with a conductive lead 71. Piezoelectric layers 72, 74, each having laminate electrodes 76, 78 of conductive material such as silver or copper on respective opposite sides thereof, are bonded to laminates 70a, 70b respectively, as with conductive cement. Insulated electrical leads 82, 84 are electrically connected to electrodes 76, 78 respectively. Layers 72, 74 may be of a material such as polarized barium titanate or lead zirconate titanate. As is understood in the art, bending layers 72, 74 generates a voltage along the bend line corresponding to the degree of the bend. Leads 82 of reeds 34, 38 are interconnected and leads 82 of reeds 36, 40 are interconnected. Since the greater bending occurs near base 22 satisfactory results are obtained when layers 72, 74 extend upwardly only part way, such as 0.4 of the distance to the upper end of board 70 although layers 72, 74 may extend upwardly other distances along board 70. Leads 84 of all reeds are coupled to directional processor 88, later described, and are ported through openings 86 in base 22 after which openings 86 are hermetically sealed as with an epoxy cement. Layers 72, 74 are polarized and electrically coupled to corresponding layers in transducers that are in the same or parallel planes for additive outputs. Conversely, application of a voltage to electrodes 76, 78 will cause a corresponding bend in layers 72, 74 and generate a corresponding wave in the surrounding medium. Wave frequency and amplitude is determined by the frequency and amplitude of the applied voltages. Due to weights 60, 62, 64, 66 the height of reeds 34, 36, 38, 40 is relatively small since the degree of reed bend is increased for a given impinging wave amplitude on the walls of hydrophone 20 and for given reed properties. While opposite reeds are shown connected electrically in series, they may alternatively be connected in parallel for desired results. Also, layers, 72, 74 in each reed may be connected electrically in parallel and oppositely polarized to obtain desired impedance characteristics and other desired results.

Electroacoustic transducing elements are obtainable commercially and may be used in place of reeds 34-40, one such element being available under the Clevite Corporation trade name "Bimorph", and are described beginning on page 170 of "Acoustics" by Leo L. Beranek, McGraw-Hill Book Company Inc., 1954. Other reed type electroacoustic transducers may be used in this invention. For example, board 70 may be of a conductive material such as aluminum, brass, or beryllium copper in which case laminates 70a, 70b would be unnecessary, conductive adhesives being used to bond the electrodes of layers 72, 74 to the sides of the conductive board 70. Also, only one of layers 72, 74 may be utilized to achieve satisfactory results. As will be understood in the art, many different types and kinds of piezoelectric effect materials can be utilized in many different combinations with a flexible, resilient reed which itself may be of many different materials and dimensions.

Transducer reeds 34, 36, 38, 40 are electrically coupled to directional processor 88 by leads 82, 84. In processor 88 the electrical signals are processed by circuitry known to the art to determine direction of the received acoustic wave. For example, circuitry like that disclosed in U.S. Pat. No. 4,268,912, cf. FIG. 11, may be used to determine direction of a received acoustic wave, which circuitry is incorporated herein by reference. The directional and omnidirectional signals provided by a hydrophone in accordance with the present invention as disclosed herein can be used as input signals in any desired "use" or "processing" circuitry for indicating a direction of an acoustic sound source with or without rotation of the hydrophone. As an example, processor 88 circuitry can be provided to utilize the sine and cosine responses of the hydrophone to compute the arc tangent of the angle of arrival of the incident sound waves. The directional sine and/or cosine like pattern outputs of the hydrophone can also be combined with the omnidirectional output to form a resultant cardioid pattern which is useful in eliminating bearing ambiguity. Such "use" circuits are well known in the art and are not described herein.

Processor 88 receives electrical signals corresponding to the amplitude and direction of a received acoustical wave, when the transducers are used in the receive mode and provides electrical signals to the transducer reeds 34, 36, 38, 40 for transmitting acoustical wave motion to the surrounding medium when in the transmit mode.

Referring to FIG. 6, dashed line pattern 90 is a FIG. 8 sine like pattern and solid line FIG. 8 pattern 92 is a cosine like pattern. An acoustic wavefront moving along x-axis 94 from the 0° direction causes a maximum output from reeds 34, 38 in the lower or negative portion of pattern 92 while a wavefront moving from the 180° direction causes a maximum output from reeds 34, 38 in the upper or positive portion of pattern 92. Similarly, acoustic wavefronts moving along y axis 96 from the 90° and 270° directions will cause maximum outputs from the right (positive) and left (negative) sides, respectively, of pattern 90. A wavefront of amplitude A moving in the direction of arrow 98 that is $\beta°$ from axis 94 will cause an electrical output equal to $A\cos\beta$ in cosine pattern 92 and $A\sin\beta$ in the sine pattern 90.

As mentioned, only one transducer reed in each of two orthogonally related planes is necessary for sine like and cosine like patterns for wave direction detection but increasing the number of reeds in each plane, or parallel to each plane, improves the sensitivity of the hydrophone. In the receive mode, sound waves impinging on an immersed hydrophone 20 will cause bulkhead 22 to vibrate with the impinging acoustic waves. Each reed 34, 36, 38, 40 will be caused to vibrate in accordance with the wave amplitude and direction providing a corresponding electrical output in leads 82, 84 for each vibrating reed. Processor 88 provides an electrical signal conveying direction and other related information about the impinging waves. For example, in a sonar application, an omnidirectional electroacoustic transducer 100 may be affixed to or encapsulated with an epoxy or other protective material in cylindrical cavity 101 in the lower or exterior surface of bulkhead 22 and coupled electrically to processor 88. Transducer 100 is of any conventional design known in the art for receiving and projecting omnidirectional acoustical waves and may be used in conjunction wih hydrophone 20, transducer 100 transmitting an acoustical wave omnidirectionally and hydrophone 20 receiving the reflection of the wave to determine direction and distance of an acoustically passive object. Also, transducer 100 may be switched to the receive mode when hydrophone 20 is in the receive mode with processor 88 combining their respective patterns to form a well known cardioid receiving pattern.

Sound waves of a given pressure impinging on wall 32 impart a radial force to wall 32. The components of that force that are transverse or perpendicular to reeds 34, 38 will cause a corresponding bend and electrical output in each of those reeds and the components of that force that are transverse or perpendicular to reeds 36, 40 will cause a corresponding bend and electrical output in each of those reeds. Since wall 32 is cylindrical, it has a section which is substantially transverse or normal to impinging waves from all directions. The larger the area of wall 32 that confronts an impinging wave pressure, the larger the force that is available to move base 22 relative to weights 60–66 and the larger the bend of reeds 34–40. Also, the lighter the weight of base 22, cover 28 and the other hydrophone 20 components are compared to the weight of each weight 60–66, the greater the sensitivity of hydrophone 20.

Referring to FIG. 7, an horizontal array of hydrophones 20 of this invention each is attached to a pair of horizontal cables 108, 110 and each hydrophone 20 has a positive buoyancy to thereby support the weight of the cables, and to maintain the cables in a substantially straight line. Alternatively, hydrophones 20 can have a negative buoyancy by making their materials and internal medium such that their overall density is greater than water or the medium in which they are suspended. However, increasing the density of the internal medium can decrease the sensitivity of the hydrophone.

Damping a high Q resonant structure may be achieved by placing a viscoelastic pad between, and bonding the pad to, the inertial weight at the end of the transducer reed and a second inertial weight. The second weight and pad are selected so that they resonate at the resonant frequency of the first weight on the reed to eliminate or reduce the motion of the first weight. In general the second weight can be expected to be considerably lighter than the first weight, for example one tenth the weight of the first weight. Also sound dampening materials or tapes can be applied to the side or sides of the reeds to accomplish damping.

While this invention has been described with reference to particular embodiments, it is to be understood that modifications may be made without departing from the scope of this invention which is set forth in the claims which follow.

What is claimed is:

1. Electroacoustic transducer apparatus for sensing and providing acoustic wave direction in a fluid acoustic medium comprising:

a rigid support base having a substantially planar support surface;

a wall having a wall area; said wall being attached to and extending substantially perpendicularly from said surface to form a walled base;

an inertia weight;

a flexible, planar, resilient reed having an electroacoustic transducer laminate on at least one side thereof that bends to convert between an electrical signal and a corresponding degree of reed bend; said reed having a first edge and a second edge opposite to said first edge;

said reed being cantilevered from said support base surface at said first edge and extending substantially perpendicularly from said surface;

said weight being affixed to said reed in spaced relation from said support surface to form a weighted transducer reed;

said weight being movable relative to said base in a direction that has a component transverse to the plane of said reed whereby sound waves impinging on said wall and having a directional component transverse to the plane of said reed will cause relative transverse movement between said base and said weight to apply a bending moment to said reed;

means for suspending said base in a fluid acoustic medium and being free of contact with a solid surface so that said base can move in said medium in correspondence with acoustic waves impinging on the area of said wall; the larger the wall area impinged upon the larger the force between said base and said weight for moving said base in said medium relative to said weight thereby increasing the degree of the bend of said reed and increasing the amplitude of the corresponding electrical signal.

2. The apparatus of claim 1 wherein said wall extends continuously around the periphery of said base to provide a substantially omnidirectional acoustic wave wall surface.

3. The apparatus of claim 2 wherein said wall is cylindrical.

4. The apparatus of claim 2 including a cover for said wall whereby said base, wall and cover form an hermetically sealed enclosure;

said reed extending in the direction of said walls and being within said enclosure.

5. The apparatus of claim 1 wherein said weight is affixed to said second edge of said weighted transducer reed.

6. The apparatus of claim 1 including a plurality of said weighted transducer reeds, each reed having a separate weight.

7. The apparatus of claim 1 including means to dampen the movement of said weighted transducer reed.

8. The apparatus of claim 7 including a viscoelastic material; attaching means to attach said viscoelastic material between said weight and said walled base to mechanically couple said weight to said walled base for damping relative movement between said weight and said walled base.

9. The apparatus of claim 8 wherein said attaching means comprises a rigid bracket arm having one end cantilevered to said base and extending outwardly from said surface;

said viscoelastic material being between and bonded to said weight and said arm.

10. The apparatus of claim 9 wherein said attaching means comprises a second rigid arm cantilevered to said base;

said weight having opposite ends;

one of said arms being positioned at one of said opposite ends of said weight; and the other of said arms being positioned at the other of said opposite ends of said weight;

said viscoelastic material comprising two portions, one of said portions being bonded between one end of said weight and one of said arms and the other of said portions being bonded between the other end of said weight and the other of said arms.

11. The apparatus of claim 10 wherein each of said portions is tapered outwardly from an end of said weight to the respective arm to provide motion proportional damping.

12. The apparatus of claims 1, 6, or 7 including a second of said weighted transducer reeds, the plane of said second reed being substanially orthogonal to the plane of said first mentioned transducer reed.

13. The apparatus of claim 12 including a first plurality of said weighted transducer reeds; each of said reeds in said first plurality having its plane oriented substantially in or parallel to a first plane;

a second plurality of said weighted transducer reeds; each of said reeds in said second plurality having its plane oriented substantially in or parallel to a second plane, said second plane being substantially orthogonal to said first plane.

14. The apparatus of claim 13 wherein said first plurality comprises a first pair of weighted transducer reeds and said second plurality comprises a second pair of weighted transducer reeds.

15. The apparatus of claim 14 wherein the weighted transducer reeds of said first and second pairs are mounted in quadrature, the reeds of said first pair being in spaced parallel relation to each other and the reeds of said second pair being in spaced parallel relation to each other.

16. The apparatus of claim 14 wherein said reeds in said first pair are coplanar and said reeds in said second pair are coplanar.

17. The apparatus of claim 13 wherein the outputs of said reeds in said first plurality are connected in additive relation and the outputs to said reeds in said second plurality are connected in additive relation.

18. The apparatus of claim 1 wherein said planar flexible resilient reed comprises a conductive layer on each side thereof;

a sheet of piezoelectric material having a conductive layer on each side thereof being bonded to each conductive layer of said reed.

19. The apparatus of claim 18 wherein said sheet of piezoelectric material extends from said base approximately .4 of the distance of said second end of said reed from said base.

20. The apparatus of claim 13 including directional processor means electrically coupled to each of said reeds for processing signals to provide an acoustical wave directional response pattern for directional reception information and to provide for directional transmission of acoustic waves.

21. The apparatus of claim 20 including an omnidirectional electroacoustic transducer attached to said base;

said omnidirectional transducer being electrically coupled to said directional processor means.

22. The apparatus of claim 20 wherein said directional response patern is substantially sine like and cosine like.

23. Electroacoustic transducer apparatus for sensing and providing acoustic wave direction in a fluid acoustic medium comprising:
   a rigid support base having a substantially planar support surface;
   a wall having a wall area and attached to and extending substantially perpendicularly from said surface to form a walled base;
   an inertia weight;
   a flexible, planar, resilient reed having an electroacoustic transducer laminate on at least one side thereof that bends to convert between an electrical signal and a corresponding degree of reed bend; said reed having a first edge and a second edge opposite to said first edge;
   said reed being cantilevered from said support base surface at said first edge and extending substantially perpendicularly from said surface;
   said weight being affixed to said reed in spaced relation from said support surface to form a weighted transducer reed;
   said weight being movable relative to said base in a direction that has a component transverse to the plane of said reed whereby sound waves impinging on said wall and having a directional component transverse to the plane of said reed will cause relative transverse movement between said base and said weight to apply a bending moment to said reed;
   means for suspending said base in a fluid acoustic medium and being free of contact with a solid surface so that said base can move in said medium in correspondence with acoustic waves impinging on the area of said wall; the larger the wall area impinged upon the larger the force between said base and said weight for moving said base in said medium relative to said weight thereby increasing the degree of the bend of said reed and increasing the amplitude of the corresponding electrical signal;
   said wall extending continuously around the periphery of said base to provide a substantially omnidirectional acoustic wave wall surface;
   a cover for said wall whereby said base, wall and cover form an hermetically sealed enclosure;
   said reed extending in the direction of said walls and being within said enclosure;
   a cable;
   a plurality of said enclosures, each of said enclosures having at least one of said weighted transducer reeds mounted therein; each of said enclosures having a positive buoyancy and being attached to and buoyantly supporting said cable to form an array of enclosures.

24. A method for sensing and providing acoustic wave direction in a fluid acoustic medium using an electroacoustic transducer having a rigid support base having a substantially planar support surface; a wall having a wall area and attached to and extending substantially perpendicular from said surface to form a walled base; an inertia weight; a flexible, planar, resilient reed having an electroacoustic transducer laminate on at least one side thereof that bends to convert between an electrical signal and a corresponding degree of reed bend; said reed having a first edge and a second edge opposite to said first edge; said reed being cantilevered from said support base surface at said first edge and extending substantially perpendicular from said surface; said weight being affixed to said reed in spaced relation from said support surface to form a weighted transducer reed; said weight being movable relative to said base in a direction that has a component transverse to the plane of said reed whereby sound waves impinging on said wall and having a directional component transverse to the plane of said reed will cause relative transverse movement between said base and said weight to apply a bending moment to said reed; comprising the steps of;
   suspending said transducer in a fluid acoustic medium so that said base and wall can move in said medium to bend the reed between the weight and the base to convert between a reed electrical signal and an acoustical wave, the larger the wall area confronting the acoustical wave pressure the larger the force for moving the base relative the weight and the greater the bending of the reed;
   processing the reed electrical signals for obtaining correspondence between the signals and the acoustical wave confronting said wall area.

25. The method of claim 24 including the step of damping the weight.

26. The method of claim 24 including the step of damping the weight by applying a viscoelastic coupling between the base and each of opposite ends of the weight.

27. The method of claim 24 wherein the step of processing the reed electrical signals obtains an acoustical wave directional response pattern.

28. The method of claim 27 wherein there are two of said transducers mounted in quadrature on said surface and wherein the response pattern of said processing step is a sine like and cosine like pattern.

* * * * *